United States Patent [19]

Lupinski et al.

[11] Patent Number: 5,153,251

[45] Date of Patent: Oct. 6, 1992

[54] FLAME RETARDANT POLYCARBONATE COMPOSITIONS

[75] Inventors: John H. Lupinski, Scotia, N.Y.; Christopher M. Hawkins, Newark, Ohio

[73] Assignee: General Electric Company, Schenectady, N.Y.

[21] Appl. No.: 714,543

[22] Filed: Jun. 13, 1991

[51] Int. Cl.$^5$ ............................................... C08K 9/12
[52] U.S. Cl. ..................................... 524/265; 524/267; 524/445; 524/447; 523/210; 523/212
[58] Field of Search ............... 524/425, 495, 496, 445, 524/405, 265, 267, 611; 523/210, 212

[56] References Cited

U.S. PATENT DOCUMENTS

| | | | |
|---|---|---|---|
| 3,971,756 | 7/1976 | Bialous et al. | 524/265 |
| 4,147,707 | 4/1979 | Alewelt et al. | 524/611 |
| 4,221,728 | 9/1980 | Jaquiss et al. | 524/267 |
| 4,357,271 | 11/1982 | Rosenqvist | 524/611 |
| 4,358,556 | 11/1982 | van Abeelen | 524/267 |
| 4,394,469 | 7/1983 | Stratta et al. | 523/212 |
| 4,446,090 | 5/1984 | Lovgren et al. | 524/265 |
| 4,478,964 | 10/1984 | Carter | 524/611 |
| 4,616,049 | 10/1986 | Thompson et al. | 523/212 |
| 4,749,738 | 6/1988 | Boutni | 524/267 |
| 4,791,016 | 12/1988 | Schulte et al. | 524/611 |
| 5,034,446 | 7/1991 | Kendall et al. | 524/265 |

FOREIGN PATENT DOCUMENTS 1-185361 7/1989 Japan .

Primary Examiner—Veronica P. Hoke
Attorney, Agent, or Firm—William A. Teoli; William H. Pittman

[57] ABSTRACT

The incorporation of silicone treated filler selected from carbon black, titanium dioxide or clay into polycarbonates or polyester carbonates has been found to provide polycarbonate compositions having improved flame retardant properties.

7 Claims, No Drawings

FLAME RETARDANT POLYCARBONATE COMPOSITIONS

BACKGROUND OF THE INVENTION

The present invention relates to flame retardant polycarbonate compositions in the form of blends of polycarbonates and silicone treated fillers such as carbon black and finely divided clays.

Prior to the present invention, as shown by Rich et al, U.S. Pat. No. 4,945,148, flame retardant silicone-polycarbonate block copolymers are provided resulting from the reaction of certain siloxy aromatic imide siloxanes or hydroxy aromatic ester siloxanes which are phosgenated with a dihydric phenol or an aromatic bischloroformate. Lewis describes in U.S. Pat. No. 4,954,549, that triarylsilicon materials, such as triphenolsilanol, can be incorporated into an aromatic polycarbonate to provide transparent, flame retardant, compression moldable thermoplastics. Although various investigations have shown that silicone resins and silicone compounds can reduce the fire hazards of plastics, it has been found that it is necessary to incorporate the silicone into the thermoplastic material utilizing a silicone in the form of a copolymer or nonvolatile compound, since readily available polydiorganosiloxane silicone fluids, such as polydimethylsiloxane fluids, are generally incompatible with thermoplastics and phase separation can occur after simply blending the ingredients.

SUMMARY OF THE INVENTION

The present invention is based on the discovery that certain fillers, such as carbon black and finely divided clays, can absorb large quantities of silicone fluids and still maintain the characteristics of a dry, free-flowing powder. For example, free-flowing silicone fluid-filler blends can be made over significant ranges by weight of fluid and filler which can be incorporated and molded into thermoplastic parts. As a result, the problem of phase separation between the silicone fluid and the thermoplastic is minimized while the resulting blend of thermoplastic such as polycarbonate and silicone treated filler, such as carbon black, has been found to be flame retardant. In particular instances such as when the ratio of filler to fluid is increased, additives such as zinc borate and/or fibrous polytetrafluoroethylene can be used to impart improved flame drip properties to satisfy $V_o$ requirements.

STATEMENT OF THE INVENTION

There is provided by the present invention a flame retardant polymer blend selected from polycarbonate or poly(estercarbonate) having from about 1% to about 6% by weight polydiorganosiloxane fluid, which polymer blend comprises from about 60% to about 95% by weight of polymer and from about 5% to about 40% by weight of a polydiorganosiloxane fluid-filler blend which is incorporated into the polymer as a free-flowing powder.

As used hereinafter, the term UL94 $V_o$ flame retardancy means that the flame retardant polycarbonates have satisfied UL94 $V_o$ requirements for flammability, as shown by the "Flammability of Plastic Materials Bulletin" of Jan. 24, 1980. More particularly, a 5"×½"×1/16" polycarbonate test bar containing an effective amount as defined hereinafter, of the flame retardant, is suspended vertically over a ¾" Bunsen Burner flame as provided in the aforementioned UL94 test. The test sample preferably exhibits a UL94 $V_o$ rating which includes the following criteria:

A. Not have any specimen which burn with flaming combustion for more than 10 seconds after application of the test flame.

B. Not have a total flaming combustion time exceeding 50 seconds for 10 flame applications for each set of five specimens.

C. Not have any specimens which burn with flaming or glowing combustion up to the holding clamp.

D. Not have any specimens which drip flaming particles that ignite dry absorbent surgical cotton located 12 inches (305 mm) below the test specimen.

E. Not have any specimens with glowing combustion which persists for more than 30 seconds after the second removal of the test flame.

In addition to satisfying the UL94 $V_o$ requirements, the flame retardant polycarbonate compositions also have been found to have satisfactory heat and smoke release rates when tested in accordance with ASTM-E906-83. The following test can be used:

Polymer plaques (6"×6"×1/16") are mounted in the horizontal mode of the test chamber. The environmental test chamber contains a constant flow of air throughout the test. Combustion is initiated by a non-piloted ignition, piloted ignition of evolved gases, or by point ignition of the surface. If ignited by piloted ignition, the end of the burner tubing is 10 mm above and perpendicular to the exposed horizontal surface of the specimen. The changes in optical density of the gas leaving the chamber are monitored and from this data, smoke release rates are determined. The results for total smoke evolved and smoke release rates are reported in smoke/square meter of sample and smoke/min/square meter respectively. The "Smoke" unit is defined by the concentration of smoke particulates in a cubic meter of air that reduces the transmission of light through a 1 meter path to 10% as measured by a calibrated photometer.

Calculations:

$$\text{Smoke Release Rate} = D/kLA(V_o/t)$$

where:

k absorption coefficient—1.0 squared meter/smoke
D optical density (absorbance) = log (100%T)
L light path—0.134 m (stack width)
A exposed surface area of specimen, squared meter
$V_o/t$ flow rate of air leaving apparatus cubic meter/min = $V_i/t \times T_o/T_i$
$V_i/t$ flow rate of air entering apparatus, cubic meter/min
$T_i$, $T_o$ absolute temperature of air in and out of apparatus respectively.

Among the aromatic polycarbonates which can be rendered flame retardant in the practice of the invention, there are included aromatic polycarbonates formed by phosgenating the following bisphenols: p,p'bisphenol A, m,p-bisphenol A, o,p-bisphenol A, spirobiindane bisphenol and tetramethylbisphenol A and tetramethylbiphenol. Copolycarbonates such as poly(estercarbonate) copolymers containing the aforementioned bisphenols as a major bisphenol constituent also are included. Preferably, the polycarbonate is a bisphenol A polycarbonate having an intrinsic viscosity (IV) of from 0.35 to 1.8 dl/g in chloroform at 25° C.

Additional polycarbonates and methods for making which are incorporated herein by reference, can be found in Schnell, et al, U.S. Pat. No. 3,028,365; Idel et al, U.S. Pat. No. 4,185,009; Evans, et al, U.S. Pat. No. 4,605,731; Evans, et al, U.S. Pat. No. 4,701,519; and Brunelle, et al, U.S. Pat. No. 4,727,134. In addition Kirk-Othmer, 3rd Edition, Vol. 18, pages 479-494, shows additional procedures.

Silicone fluids which can be utilized in the practice of the present invention are polydiorganosiloxane fluids where the organo radicals are attached to silicon by carbon-silicon linkages and the fluids are preferably polydimethylsiloxane fluids or silicone fluids consisting essentially of chemically combined dimethylsiloxy units, with one or more siloxy units such as methoxymethylsiloxy, methylphenylsiloxy units and diphenylsiloxy units. The polydiorganosiloxane fluids are preferably chain terminated with triorganosiloxy units, such as trimethylsiloxy units, and can have a viscosity in the range of from about 50 centipoise to 10,000 centipose at 25° C. These fluids can be made by standard hydrolysis procedures from chlorosilanes, such as dimethyldichlorosilane and trimethylchlorosilane, or by equilibration procedures involving the use of cyclic polydiorganosiloxanes such as octamethylcyclotetrasiloxane or hexamethylcyclotrisiloxane and chain stopping disiloxanes, such as hexamethyldisiloxane, using equilibration catalyst, such as acid clay.

Fillers which can be utilized in the practice of the present invention preferably have a particle size in the range of from 10 nm to 10 μm and can be selected from calcined clays such as kaolin, metal oxides for example, silicon and aluminum oxides, lampblack and calcium carbonate. The preferred fillers are lampblack and clays, such as Satintone 5 and Translink 555 from the Engelhard Company, Edison, N.J.

The filler can be treated with polydiorganosiloxane fluid by mixing the polydiorganosiloxane fluid with the finely divided filler in a suitable container and with a standard means of agitation, such as by stirring or mechanical mixing. Various fluids can be diluted with solvents e.g., toluene to facilitate the mixing with the fillers. After mixing the solvent can be removed by evaporation. Sufficient polydiorganosiloxane fluid can be used to provide a weight increase over the initial weight of the filler of at least 20% by weight. The fluid should not exceed an amount which would produce a mixture which was not free-flowing after mixing. There also can be used from 0 to 1 part of fibrous polytetrafluoroethylene and from 0 to 8 parts by weight of anhydrous zinc borate, per 100 parts by weight of flame retardant polycarbonate composition.

In order that those skilled in the art will be better able to practice the present invention the following examples are given by way of illustration and not by way of limitation. All parts are by weight.

EXAMPLE 1

Blends of carbon black and polydimethylsiloxane fluid were prepared using as carbon blacks, Lampblack C-198 from Fisher Scientific located in Pittsburgh, Pa. and Raven 1020 from Columbian Chemicals Co. The carbon blacks were mixed with polydimethylsiloxane fluid, PS040 of the Petrarch Co. having a viscosity of about 50 centipoise at 25° C., or with SF96-50, a polydimethylsiloxane fluid from GE Silicones of Waterford, N.Y. having a viscosity of about 50 centipose at 25° C. The carbon blacks were blended with the silicone fluids by simply mixing in an appropriate container. The resulting silicone fluid modified carbon blacks contained about 40-50% by weight fluid.

The treated carbon blacks, in the form of dry powders, were then compounded with Lexan® polycarbonate (140) resin, a product of GE Co., to provide compositions containing approximately 85-87% by weight of polycarbonate, up to 9% by weight of carbon black and up to 6% by weight of silicone fluid. In some instances, fibrous polytetrafluoroethylene was used. Test bars for UL 94 testing (FR Rating) were prepared by injection molding. In addition to carbon blacks, Translink 555, a clay from Engelhard Col, located in Edison, N.J. was also used as a filler. The following results were obtained, where all values are shown in wt %:

TABLE 1

| | Sample | | | | | |
|---|---|---|---|---|---|---|
| | 1 | 2 | 3 | 4 | 5 | 6 |
| Lexan 140 | 87.5 | 87.5 | 87.5 | 87.26 | 85.0 | 80 |
| Lamp Black | 7.5 | 7.5 | 7.5 | 7.5 | 9.0 | |
| Translink | | | | | | 13 |
| Silicone Fluid | 5.0 | 5.0 | 5.0 | 5.0 | 6.0 | 5 |
| Polytetrafluoroethylene | — | — | — | .24 | — | |
| Zinc Borate | | | | | | 2 |
| FR Rating | $V_0$ | $V_2$ | $V_1$ | $V_0$ | $V_2$ | $V_0$ |

In addition to UL94 testing, OSU testing was also used. In sample 1 an OSU value for heat release rate (HRR) was 52% of the virgin Lexan resin value and a 56% value was obtained from the (SRR) smoke release rate. Flaming drips on sample bars 2 and 5 were obtained in the second burn. A modified filler was used in sample 3 by predissolving the silicone fluid in toluene prior to filler treatment. Fibrous polytetrafluoroethylene was included in sample 4 to eliminate flaming drips.

EXAMPLE 2

In accordance with the procedure of Example 1, 13 parts of Translink 555, a surface modified aluminum silicate of Engelhard Co., was blended with 5 parts of SF96-50, a polydimethylsiloxane fluid having a viscosity of 50 centistokes which was obtained from the Silicone Products Division of GE, Co. There was obtained a free flowing dry powder which was blended with 80 parts of Lexan polycarbonate of the GE Plastics Division. In addition there was incorporated into the mixture 2 parts of zinc borate. The resulting mixture was extrusion compounded and then formed into UL94 test bars by injection molding. It was found that the resulting formulation provided a test sample which satisfied the $V_o$ requirements of the UL94 test.

EXAMPLE 3

Additional UL94 test samples were prepared in accordance with the procedure of Example 2 employing Translink 555 aluminum silicate powder in combination with SF96-50 and SF96-350, a polydimethylsiloxane having a viscosity of 350 centistokes of the GE Silicone Products Division. A proportion of about 6 to about 21 parts of the Translink 555 was blended with from 4 to 6 parts of the aforementioned silicone fluids. The resulting treated fillers were then compounded with from 75 parts to about 89 parts of PPC polyestercarbonate resin a product of GE Plastics Division. UL94 test bars were prepared by injection molding and the following results were obtained as shown in Table 2.

TABLE 2

| Ingredients | Flammability Characteristics of PPC Formulations | | | | | | | | | | | | | |
|---|---|---|---|---|---|---|---|---|---|---|---|---|---|---|
| | Parts By Weight | | | | | | | | | | | | | |
| PPC | 100 | 88.9 | 88.9 | 86.7 | 88.9 | 85.0 | 80.0 | 80.0 | 80.0 | 75.0 | 75.0 | 80.0 | 85.0 | 85.0 |
| Satintone 5 | | 6.1 | | | | | | | | | | | | 10.0 |
| Translink 555 | | | 6.1 | 7.3 | 6.1 | 9.0 | | 16.0 | 16.0 | 21.0 | 21.0 | 14.0 | 10.0 | |
| CaCO$_3$ | | | | | | | 16.0 | | | | | | | |
| SF 96-50 | | 5.0 | 5.0 | 6.0 | | | 4.0 | 4.0 | | 4.0 | | | | |
| 96-350 | | | | | 5.0 | 6.0 | | | 4.0 | | 4.0 | | | |
| 81893 | | | | | | | | | | | | 4.0 | 3.0 | 3.0 |
| Anhydrous Zn Borate | | | | | | | | | | | | 2.0 | 2.0 | 2.0 |
| Flammability Characteristics | | | | | | | | | | | | | | |
| Peak HRR[1] | 140 | | 76 | 90 | 119 | | 96 | 96 | 85 | | | | 83 | 73 |
| SRR[2] | 160 | | 92 | 120 | 120 | | 111 | 123 | 113 | | | | 60 | 70 |
| FR Rating | FDFB | FDFB[3] | $V_0$ | $V_0$ | $V_1$ | 1 FOT 53 FDSB[3] | $V_1$ | $V_0$ | $V_1$ | $V_0$ | $V_1$* | $V_1$ | $V_1$** | |

[1]HRR = Heat Release Rate
[2]SRR = Smoke Release Rate
[3]FDFB = Flaming Drips First Burn. FDSB = FD. Second Burn
*one burn > 10 secs. otherwise $V_0$
**long edge burns, otherwise $V_0$

EXAMPLE 4

In accordance with the procedure of Example 2, additional fillers were treated with various silicone fluids and then blended with polycarbonate resin along with anhydrous zinc borate to prepare test bars for both the UL94 test and the Ohio State University Smoke and Heat Test (ASTM-E96) to determine peak heat release rate (HRR) and peak smoke release rate (SRR). There were utilized Satintone 5 and Translink 555 of the Engelhard Co. and calcium carbonate from the Pfizer Co. as fillers. In addition SF96-50 fluid, SF95-350 fluid and SF81-893 silicone fluid, polydimethylsiloxane fluids of the Silicone Products Division of GE Co. were utilized. An effective amount of an anhydrous zinc borate was also used in particular situations. The results obtained, where FDFB means "flaming drip on first burn" which was observed in some cases during the UL94 determinations, are shown above in Table 2.

Table 2 results further show that the HRR and SRR are substantially reduced as a result of the use of silicone modified fillers in accordance with the practice of the invention.

Although the above examples are directed to only a few of the very many variables which can be used in the practice of the method of the present invention it should be understood that the present invention is directed to a much broader variety of flame retardant polycarbonate compositions as set forth in the description preceding these examples.

What is claimed is:

1. A flame retardant polycarbonate or polyestercarbonate composition exhibiting a substantial reduction in heat release rate, comprising from about 60% to 95% by weight of polycarbonate or polyestercarbonate and about 5% to 40% by weight of a blend of a polydiorganosiloxane fluid having a viscosity of from about 50 centipoise to 10,000 centipoise at 25° C. and a calcined clay, which polydiorganosiloxane fluid-calcined clay blend is incorporated into the polycarbonate composition as a free flowing powder to provide from about 1% to about 6% by weight of the polydiorganosiloxane fluid based on the weight of the flame retardant polycarbonate composition.

2. A flame retardant poly(estercarbonate) blend in accordance with claim 1.

3. A flame retardant polycarbonate composition in accordance with claim 1, where the silicone fluid is a polydimethylsiloxane fluid.

4. A flame retardant polycarbonate composition in accordance with claim 1, which contains an effective amount of fibrous polytetrafluoroethylene.

5. A flame retardant polycarbonate composition in accordance with claim 1, which contains an effective amount of anhydrous zinc borate.

6. A flame retardant bisphenol A polycarbonate blend in accordance with claim 1.

7. A flame retardant bisphenol A poly(estercarbonate) blend in accordance with claim 1.

* * * * *